United States Patent Office 3,254,057
Patented May 31, 1966

3,254,057
POLYHALOGENOUS POLYESTER
COMPOSITIONS
Pauls Davis, Gibraltar, Mich., assignor to Wyandotte
Chemicals Corporation, Wyandotte, Mich., a corporation of Michigan
No Drawing. Filed Nov. 9, 1962, Ser. No. 236,683
19 Claims. (Cl. 260—78.4)

The present invention relates to polyesters, and is more particularly concerned with polyhalogenous polyesters having pendant polyhalogenoalkyl groups which are extremely useful as non-self-fusing polyester materials of increased chemical and fire resistance and which are particularly useful in the preparation of more complex polyester-based compositions which have a relatively high order of non-flammability and which in many cases are non-burning as well as self-extinguishing.

The commercial potentialities of polyesters and related polymeric materials based on polyesters were recognized during the 1930's and especially during the Second World War. The ultra high strength properties of many of these compositions, combined with their light weight and durability, made them successful competitors in many applications with more conventional structural materials such as steel and aluminum. Polyester-based materials proved to be especially valuable. It was found that polyesters containing ethylenic unsaturation could be successfully copolymerized with unsaturated monomers to give hard durable plastics, with wide variations in properties possible by varying the proportions and identity of the initial reactants. Such polyesters could be applied on a surface and air-dried to give tough, elastic, weather-resistant coatings. They could also be applied to reinforcing material such as glass fiber to give strong structural materials. When polyesters were used as intermediates with compounds containing functional groups capable of reacting with hydroxy or carboxy groups of the polyester, for instance isocyanates, a wide variety of products could be obtained ranging from soft and flexible to hard and brittle plastics, elastomers and foams.

However, in spite of the excellent physical and chemical properties of such polyester-based compositions, it was also found that they possess a major disadvantage, and consequently a factor which limits the area of their potential use: they are flammable and burn readily. Safety requirements as imposed by insurance underwriters and civic ordinances dictate that materials more resistant to fire be used. Several procedures and modifications have therefore been suggested to improve the flame resistance of these materials, and thereby obviate this shortcoming. These systems generally involve the incorporation of flame-resistant materials or elements into the composition, either as a coating, a physically or chemically contained fire retarder, or as an integral part of one of the reactants.

Coatings are usually the least effective, and therefore least desirable, since a break or crack or some other form of coating deterioration renders the underlying composition unprotected against fire destruction. A more effective, and generally more economical system, involves incorporating a fire retarding filler or additive, generally preferred compounds being inorganic salts, borates, silicates, antimony oxides, phosphates and phosphites and derivatives thereof, in the composition during some stage of its preparation, usually the final polymerization stage. Some of the more readily available fire retarding compounds which are useful for this purpose are sufficiently stable under mild exposure conditions, but break down upon exposure to weathering and/or moderate temperature cycling, thereby causing the polymer to lose whatever flame resistance it had originally. It has even been found that, in certain compositions, the presence of such fillers will weaken the composition, and may ultimately cause it to crumble and disintegrate. Thus, the costly step of incorporating such additives in the plastic may be undertaken without the realization of any permanent benefit, and indeed may even have a detrimental effect on other desirable properties of the unmodified composition.

It has also been found that polyester compositions having improved fire resistance may be prepared by incorporating hexachloroendomethylene tetrahydrophthalic anhydride and like materials therein. Compositions so prepared are generally "self-extinguishing," meaning that they will burn when exposed to a flame source and will, at best, cease burning after the flame source has been removed and before being completely consumed. Materials modified in this way are therefore still liable to extensive damage if directly exposed to fire. Even though such modified compositions represent an improvement in the art, they are less fire resistant than desired and are thus inadequate for many purposes.

It is an object of the present invention to provide a new and useful class of polyhalogenous polyesters. An additional object is the provision of a novel class of polyhalogenous polyesters which are useful as intermediates in the preparation of polymeric compositions which have a relatively high order of non-flammability, and which in many cases are non-burning. Another object is to provide a new class of polyesters which have a high permanent halogen content. A further object is the provision of a new class of polyhalogenous polyesters useful for preparing polymeric compositions having permanent fire resistant properties. Still an additional object is to provide a novel class of polyhalogenous polyesters, useful in the preparation of polymeric compositions having improved chemical resistance. Yet another object is to provide a novel class of polyhalogenous polyesters which exhibit a low degree of heat distortion, thus minimizing cold flow. Still another object is the provision of a novel class of ethylenically unsaturated polyesters which may be cross-linked to give polyester resins having a high degree of non-flammability and chemical resistance. A still further object is the provision of a method for the preparation of said polyhalogenous polyesters. Another object is the provision of such a method which is characterized by its relative ease and rapidity compared with known commercial polyesters processes. Additional objects will be apparent to one skilled in the art and still other objects will become apparent hereinafter.

It has now been found that the foregoing and additional objects are accomplished by the provision of a novel class of polyhalogenous polyesters having a relatively high halogen content and characterized by pendant lower-alkyl groups having up to two carbon atoms and containing at least two halogen atoms, said pendant polyhalogenous lower-alkyl groups being built into the polyester chain as exo-substituents of an oxyalkylene moiety thereof. When they contain ethylenic unsaturation, these polyesters can be cross-linked with unsaturated monomers to give hard plastics which have physical properties comparable or superior to those of commercially available polyester plastics, superior chemical stability as compared with many commercial polyester plastics, and which are often non-burning.

The polyesters of the present invention are polyesters of an organic dicarboxy compound and a polyhalogenous alkylene oxide. They may be prepared by reacting an organic dibasic acid anhydride or acid or mixtures thereof with one or more polyhalogenous alkylene oxides or mixtures of a polyhalogenous alkylene oxide with a non-polyhalogenous alkylene oxide, which is preferably saturated or free from other than aromatic unsaturation. Essentially, the polyhalogenous alkylene oxide, and non-polyhalogenous alkylene oxide if used, reacts with the dibasic acid or anhydride to give a polymer chain comprising alternating acid and oxyalkylene units, one or two or more of such oxyalkylene units being joined in the polymer chain depending on the reactants and ratio of reactants, said polymer chain being characterized by pendant polyhalogenoalkyl groups.

Thus, the recurring units of the preferred polymeric products of the invention may in general be depicted by the formula:

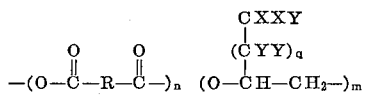

wherein R is the residue of the dibasic acid (or anhydride), Y is hydrogen or halogen, and X is halogen, wherein $q$ is zero or one, and wherein $n$ and $m$ are small whole numbers usually from 1 to 3, inclusive. This unit formula also includes a third moiety because a non-polyhalogenous alkylene oxide may be included in the reaction mixture. The additional moiety has the formula:

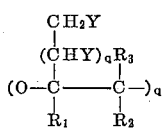

wherein $p$ is zero or a small whole number usually from 1 to 3, inclusive, wherein $R_1$, $R_2$ and $R_3$ can be the same or different and represent hydrogen or a saturated or aromatically unsaturated radical, and wherein only one Y can be halogen. The weight of all such optionally present third moieties combined, when present, will preferably not exceed about 50% of the combined weight of all oxyalkylene moieties taken together. The moieties or subunits of the recurring structural units may, of course, be present in any order. The radical or residue will be the same whether a particular acid or the corresponding anhydride is employed in preparing the polyester, and designation of R as being the residue or radical of the acid or the anhydride should, therefore, not be construed as a limitation to the use of either the acid or the anhydride as starting material in the preparation of the polyester.

The polyhalogenous alkylene oxides used to prepare the polyesters of the present invention are vicinal alkylene oxides, containing up to four carbon atoms, having an alkyl group attached to a carbon atom of the oxirane ring, said alkyl group having up to two carbon atoms and containing at least two halogen atoms. Representative of this class of alkylene oxides are 1,1-dichloro-2,3-expoxypropane, 1,1,1-trichloro-2,3-epoxypropane, 1,1,1-trifluoro-2,3 - expoxypropane, 1 - bromo-1,1-dichloro-2,3-epoxypropane, other mixed 1,1,1-trihalo-2,3-epoxypropanes, 1,1,1-trichloro - 3,4 - epoxybutane, 1,1 - difluoro-1-chloro-2,3-epoxypropane, 1,1, - dichloro - 1-fluoro-2,3-epoxypropane, 1,1,1 - tribromo-3,4-epoxybutane, 1,2-dibromo-3,4-epoxybutane, 1,1,1,2,2-pentachloro-3,4-epoxybutane, 1,1,1,2,2-pentafluoro-3,4-epoxybutane, 1,1,1,2,2-mixed pentahalo-3,4-epoxybutanes, et cetera. Preferably all of the valences of the terminal carbon atom of the alkyl group are satisfied by halogen atoms, or alternatively the halogen atoms present are preferably present on the terminal carbon atom of the alkyl group.

When these polyhalogenous alkylene oxides react, the oxirane ring is opened with the breaking of an oxygen-carbon bond to give a bivalent unit wherein the members of the oxirane ring form a bivalent linear chain having the polyhalogenous lower-alkyl group, originally attached to a carbon atom of the oxirane ring, as an exo-substituent. By its reaction with the acid or anhydride, this bivalent unit is bonded through the two free valences to other components of the polyester, thereby locating it in and along the polyester chain as a polyhaloalkyloxy-alkylene group or radical and building the polyhalogenous lower-alkyl group into the polyester as an exo-substituent. The bivalent oxyalkylene radical may be bonded through both valences by way of ester linkages to acid radicals, or it may be bonded through one or both valences to additional oxyalkylene radicals to form a polyoxyalkylene chain. The average length of the oxyalkylene chains forming a polyether moiety in the polyester chain is determined by the precise reactants, the reaction time, and ratio of reactants, as more fully explained hereinafter and as will be apparent to one skilled in the art.

The ability of alkylene oxides to react with carboxy compounds is will known in the art. For instance, Noller (Chemistry of Organic Compounds, W. B. Saunders Co., Philadelphia 1957, p. 751) mentions that carboxy groups can react with epoxy groups to give esters. However, such a reaction generally gives products which are primarily homopolymers of the alkylene oxide, and in which the carboxy compound merely acts as an initiating molecule for the polyoxyalkylene chain. I have found the same undesirable result to occur when a monohalogenous alkylene oxide is used in the reaction. For this reason the ostensibly advantageous and convenient method of preparing polyesters by the direct use of alkylene oxides has not been heretofore utilized. It has, however, now been found that when the above-described polyhalogenous alkylene oxides are reacted with dibasic acids or anhydrides, the polymerization is such that a polymer chain of alternating polyhaloalkyloxyalkylene and acid units is obtained, rather than a largely homopolymeric polyoxyalkylene chain. Evidently the presence of the polyhalogenous lower-alkyl group attached to the oxirane ring of the starting polyhalogenous alkylene oxide deactivates the oxide so that its reactivity with respect to more active carboxy groups of the dicarboxy compound is greater than toward other alkylene oxide molecules, thereby keeping the less desirable homopolymerization of the oxide to a minimum. Studies to confirm this hypothesis have revealed that in this reaction the first mole of oxide reacts considerably faster than the second, which in turn reacts faster than the third. In practice it has been found that when the oxide and the acid or anhydride are reacted in equimolar quantities, polyesters are obtained which essentially comprise alternating acid and polyhaloalkyloxyalkylene units, although a small though not detrimental amount of homopolymerization may occur. When the proportion of oxide to acid or anhydride is increased, polyesters are obtained wherein the acid units are separated by polyether units consisting of two or more polyhaloalkyloxyalkylene groups.

In the formation of the polyesters of the present invention, it is possible to vary the proportion of alkylene oxide to dicarboxy compound over a considerable range. The polyesters so formed are of somewhat varied character depending on the proportions of alkylene oxide and dicarboxy compound used. The preferred range in an individual case depends on a number of factors including intended use of the polyester, properties desired in both the polyester itself and in compositions based on the polyester, the exact reactants employed, and so forth. For example, ethylenically unsaturated polyesters having good color and workable viscosities are prepared by reacting 3,3,3-trichloropropylene oxide with maleic anhydride in a mole ratio of two of the former to one of the latter in the presence of an aluminum chloride catalyst. When cross-linked with a suitable amount of an unsaturated monomer such as styrene, a hard, durable, non-burning plastic having a high degree of chemical resistance is obtained. A polyester having a higher cross-link density, that is, a higher concentration of sites of unsaturation, may be obtained by decreasing the ratio of trichloropropylene oxide to maleic anhydride to one to one. By increasing the ratio to three to one or higher, polyesters having decreased cross-link densities are obtained, which upon modification result in cross-linked products which are generally more flexible and less hard. In most instances, if it is desired to prepare ethylenically unsaturated polyesters which are to be cross-linked with ethylenically unsaturated cross-linking agents, it is preferred to use no more than three moles of polyhaloalkylene oxide for every mole of dicarboxy compound in order to obtain polyesters having the preferred cross-link densities. At molar ratios of alkylene oxide to ethylenically unsaturated dicarboxy compound above three to one, the decreased cross-link density resulting from the increased length of the polyether units in the polyester chain, and consequently the increased spacing between the unsaturated sites of the polyester, is manifested by a decline in some of the advantageous physical properties of the cross-linked plastic, including hardness and strength, as well as in some of the advantageous chemical properties. For some applications, however, the higher ratios are quite suitable. In general, the higher the ratio of polyhalogenous alkylene oxide to dicarboxy compound, other factors being constant, the softer and more elastic the polyester composition. Ordinarily, ratios of alkylene oxide to dicarboxy compound of about one to about three to one are preferred although, if desired, ratios as high as six to one or even higher may be successfully employed. When mixtures of carboxy compounds or mixtures of alkylene oxides are employed, the ratios will remain approximately the same.

When mixtures of ethylenically unsaturated dicarboxy compounds with non-ethylenically unsaturated dicarboxy compounds are used, the resulting increased spacing between unsaturated sites of the polyester due to the inclusion in the polyester chain of dicarboxy units containing no ethylenic unsaturation is responsible for a decreased cross-link density, and frequently also a decrease in the desirable physical properties of cross-linked compositions formed therefrom. For this reason, to obtain polyesters having optimum cross-link densities, it is sometimes desirable to alter the ranges of proportions of the dibasic acid or anhydride to alkylene oxide to take into consideration the degree of unsaturation of the mixture of dicarboxy compounds being employed, as will be apparent to one skilled in the art.

When polyesters are being prepared for other purposes, such as incorporation into drying oils or unsaturated rubber, natural or synthetic, the proportions of alkylene oxide to dicarboxy compound may be advantageously varied over wide ranges and, as previously stated, polyesters having good workable viscosities and satisfactory molecular weights may be prepared by using ratios of alkylene oxide to dicarboxy compound as high as six or more to one.

The properties and structure of the polyesters may also be varied by using mixtures of alkylene oxides, such as two or more polyhalogenous alkylene oxides together, or a polyhalogenous alkylene oxide with a mono- or non-halogenous alkylene oxide. The use of such mixed oxides has the effect of minimizing the crystallinity of the polymer, and generally results in more flexible products when the polyester is further reacted. By controlling the order of addition of these combinations of alkylene oxides, it is moreover possible to tailor the polymer. In this way, for example, it is possible to space the pendant polyhalogenous alkyl groups evenly along the polymer chain.

Alkylene oxides which may be used as coreactants with the polyhalogenous alkylene oxides are vicinal alkylene oxides which are saturated or free of other than aromatic unsaturation. Any halogen present may be of the type indicated for the starting polyhalogenous alkylene oxide. Examples of such alkylene oxides are ethylene, propylene, 1,2-butylene, 2,3-butylene, isobutylene oxide and dodecene oxide, epichlorohydrin, epibromohydrin, styrene-oxide, chlorostyrene oxide, methylstyrene oxide, methyl glycidyl ether, phenyl glycidyl ether, oleic acid epoxide, and so forth. The preferred maximum number of carbon atoms in any non-polyhalogenous alkylene oxide is 18.

The amount of such non-polyhalogenous alkylene oxide which can be employed is limited, and when a non-polyhalogenous alkylene oxide is employed as a part of the starting alkylene oxide reactant, the percentage of polyhalogenous alkylene oxide in the total starting alkylene oxide reactant should not be less than about 50% and is preferably at least about 75 to 90 percent by weight. The non-polyhalogenous alkylene oxide starting material, when used, is saturated or devoid of other than aromatic unsaturation and has a hydrogen atom or an alkyl group attached to a carbon of its oxirane ring, said alkyl group having up to two carbon atoms and containing from zero to one halogen atom, inclusive.

Any halogen or combination of halogens may be present in the starting polyhalogenous alklene oxide, and consequently also in the pendant polyhalogenous lower-alkyl groups built into the polyester. Of the halogens, chlorine, fluorine, and bromine are preferred, and the halogen therefore has an atomic weight of 19 to 80, inclusive.

In general, the higher the halogen content incorporated by the pendant polyhalogenoalkyl groups into the polyester, the better the overall fire resistance and chemical resistance of the polyester products. For this reason, starting alkylene oxides containing more than two halogen atoms on the alkyl substituent of the oxirane ring are preferred over the corresponding alkylene oxides containing only two halogen atoms. By way of example, 3,3,3-trichloropropylene oxide, which contains three halogen atoms on the polyhalogenoalkyl group, is preferred over the corresponding dihalogenoalkylene oxide, 3,3-dichloropropylene oxide. The preferred halogen content by weight in the polyesters of the invention is at least about 25% and preferably 35 to 55 percent.

The starting acid and anhydride compounds of the present invention are dibasic organic acids and dibasic acid anhydrides preferably contain up to and including 12 carbon atoms. Representative compounds include aliphatic dibasic acids and anhydrides such as malonic, succinic, perfluorosuccinic, glutaric, perfluoroglutaric, adipic, perfluoroadipic, pimelic, suberic, azelaic, sebacic, etc.; cycloaliphatic dibasic acids and anhydrides such as tetrahydrophthalic, hexahydroterephthalic, hexachloroendomethylene tetrahydrophthalic, etc.; aryl dibasic acids and anhydrides such as phthalic, isophthalic, terephthalic, etc.; ethylenically unsaturated dibasic acids and anhydrides such as maleic, fumaric, chloromaleic, itaconic, citroconic, mesaconic, etc.; and the like. These dibasic acids and anhydrides may be used singly or in mixtures, including mixtures of acids with anhydrides, and mixtures of ethylenically unsaturated dicarboxy compounds with non-ethylenically unsaturated dicarboxy compound. Mixtures of ethylenically unsaturated carboxy compounds with other carboxy compounds are useful as the preparation of cross-linkable unsaturated polyesters. However, when mixtures of ethylenically unsaturated and non-ethylenically unsaturated compounds are used, the ethylenically unsaturated component of the mixture should be present in amount of at least about 40%, and preferably at least about 60%, by weight of the total dicarboxy component if it is desired to provide sufficient unsaturated sites for cross-linking. When less than this preferred minimum is used, cross-linked plastics derived from the resulting polyester tend to be softer and more flexible, with a decline in some of the desirable properties of the plastic. Usually, for plastics having optimum physical and chemical properties, the amount of ethylenically unsaturated carboxy compound in the mixture considerably exceeds the stated minimum.

In general, it is preferred to employ starting anhydrides rather than acids since the addition reaction of anhydrides and alkylene oxides proceeds without formation of water of esterification. When acids are used, the water of esterification which forms may be removed from the product by any convenient or conventional procedure, such as by vacuum distillation.

The reaction can be carried out by merely heating and reacting the polyhalogenous alkylene oxide with the starting organic carboxy compound, but is preferably conducted in the presence of a reaction catalyst, Friedel-Crafts type catalysts being generally preferred. These include anhydrous aluminum chloride, antimony pentachloride, stannic chloride, ferric chloride, et cetera, as well as various halide analogs of the compounds, and their alkoxides. Additional catalysts include boron trifluoride, the formates of zinc, aluminum, and tin, litharge, and so forth. The preferred catalyst depends on the individual reaction, and a catalyst effective for one particular system may be relatively inefficient with a different system, or even for different proportions of the same reactants. For example, aluminum chloride is particularly active in the reaction between 3,3,3-trichloropropylene oxide and maleic anhydride. Stannic chloride and ferric chloride, the latter especially when low ratios of oxide to anhydride are used, are effective catalysts in the polymerization of 3,3-dichloropropylene oxide and maleic anhydride. Of the two, stannic chloride is preferred.

Only small amounts of the more active catalysts such as aluminum chloride and stannic chloride are needed to effect a substantially complete reaction in a short time. For example, only 0.27% on a weight basis (or 0.2 mole percent) of freshly sublimed, anhydrous aluminum chloride is sufficient to catalyze the reaction between 3,3,3-trichloropropylene oxide and maleic anhydride. The product obtained in this way has a theoretical ash content of 0.15% as aluminum oxide, sufficiently low for most purposes to make salt removal unnecessary. For other catalysts the optimum amount will vary. Satisfactory results are ordinarily obtained with catalyst concentrations of from a few tenths of one percent to one percent or more, based on the total weight of the reactants, depending on the particular catalyst and reactants. If desired, more or less than this amount may be used, even up to a relatively uneconomic 10% by weight of reactants.

The catalyst may be used in its isolated form, or it may be suspended in a diluent or dissolved in a solvent. It is generally preferred to use a solventless system whenever possible since solvents are frequently difficult to remove from the product, making them economically undesirable, and they may also adversely influence the reaction and tend to discolor the product. The reaction may also be conducted in the absence of catalyst. However, this procedure has the disadvantage of low yields and, when strong heating is employed, frequently discolored products, as well as an uneconomically long reaction time, and is therefore not preferred.

The polyesters are generally formed by heating and reacting the polyhalogenous alkylene oxide with the starting organic dicarboxy compound, as well as other reactants, if any, preferably in the presence of a suitable reaction catalyst at an elevated temperature ranging from about 75° C. to the reflux temperature of the polyhalogenous alkylene oxide or higher with a temperature of at least 90° C. being preferred. Normally, the reflux temperature of the reaction mixture, generally from about 150° to about 170° C. when a solventless system is used, is recommended. When a solvent is employed, the reflux temperature of the mixture may be considerably lower, as for example when toluene is used, and if sufficiently high may be used as the reaction temperature. However, it is normally preferred to use no solvent, since one is generally not needed, and removal of solvent from the product is often economically disadvantageous. When it is desired to use a solvent, non-aqueous or substantially non-aqueous organic solvents and solvents which are unreactive with the reactants and products of the reaction are preferred. These include hydrocarbons such as benzene, toluene, hexane, et cetera; and halohydrocarbons such as halobenzenes, e.g. chlorobenzene, halotoluenes, aliphatic halohydrocarbons such as high-boiling polyhalomethanes, et cetera. With low boiling solvents it may be necessary to conduct the reaction under greater than atmospheric pressure, but normally atmospheric pressure is preferred since the use of increased pressure, although operative, sometimes makes control of the exothermic heat of reaction difficult. The reaction may be advantageously conducted under an inert atmosphere, as of nitrogen or carbon dioxode. The use of such an inert atmosphere usually improves the overall color of the product.

Any of several different general procedures may be used in carrying out the reaction between the starting polyhalogenous alkylene oxide and dicarboxy compound. The oxide, dicarboxy compound and reaction catalyst, if any, can all be mixed at once and the reaction mixture heated to the desired temperature range. The reaction between the alkylene oxide and dicarboxy compound is exothermic at reaction temperatures so that considerable heat may evolve and maintain the desired temperature for a period without additional external heating, and may even require external cooling. It is possible to take advantage of the exothermic heat of reaction by adding one or more of the reactants to the reaction mixture portionwise, preferably the alkylene oxide, at such a rate that the desired reaction temperature is maintained. Once the initial polymerization stage has been completed, as indicated by the cessation of refluxing when a solventless reaction is conducted at the reflux temperature of the reaction mixture, the reaction mixture is heated for an additional period to drive the reaction to completion and to effect the desired degree of polymerization. In a preferred variation of this general procedure, the dicarboxy compound is initially reacted with the catalyst to form a catalyst-monomer complex which is in turn reacted with the polyhalogenous alkylene oxide. Alternatively, the catalyst-monomer complex is initially esterified with a portion of the polyhalogenous alkylene oxide, and then reacted with the remaining alkylene oxide which is added to the reaction mixture continuously, incrementally, or batchwise. In another variation, only a portion of the dicarboxy compound or mixture of dicarboxy compounds is initially reacted with the polyhalogenous alkylene oxide and then finally the remainder. In addition, combinations of two or more of these approaches and other variations readily apparent to one skilled in the art may be used to carry out the reaction. The procedure may be the same whether one or more polyhalogenous alkylene oxides or mixtures with a nonpolyhalogenous alkylene oxide are employed as starting material, and whether one or more saturated or unsaturated dicarboxylic compounds or mixtures thereof are employed as starting materials.

The catalyst may be added to a mixture of all the reactants at once, or it may be initially reacted or mixed with the dicarboxy compound or mixture of dicarboxy compounds as previously indicated. In general, it has been found disadvantageous to treat the starting alkylene oxide with catalyst at elevated temperatures in the absence of starting dicarboxy compound, since an exothermic reaction usually results, frequently causing severe discoloration and, when the dicarboxy compound is reacted, the resulting polyester is darkly colored and has diminished physical and chemical properties. My preferred procedure consists in, first, mixing and complexing the catalyst with the dicarboxy compound, and then adding the oxide to the catalyst-dicarboxy compound complex.

Although other procedures may be used, the reaction is advantageously carried out in a polymerization or other type reaction kettle fitted with condensing and stirring apparatus, a temperature recording or reading device, and a heat source. To this reaction container is connected a mixing or addition container, fitted in the same way as the polymerization kettle, which permits addition of the reactants to the main polymerization kettle. An inert atmosphere such as carbon dioxide or nitrogen is preferably used, the inert gas being used to dry the equipment as well as minimize color formation due to air oxidation.

In a recommended procedure, the starting dicarboxy compound is charged to the mixing container and heated, and the catalyst then added to form a catalyst-monomer slurry. Generally a slight evolution of heat is observed. The polyhalogenous alkylene oxide is then added to the catalyst-monomer slurry with stirring, and the mixing container heated at a moderate temperature and stirred to maintain the mixture fluid. The polymerization kettle is heated to the desired reaction temperature and an amount of reaction mixture sufficient to cover the stirring and temperature reading devices is added from the mixing container. Polymerization is preferably carried out at the reflux temperature of the reaction mixture. The remaining reaction mixture is added incrementally to the reaction kettle at such a rate as to maintain the desired temperature of the polymerization mixture. The reaction may be controlled either by controlled addition of the reaction mixture to the reaction zone or by gradual cooling or heating of the reaction kettle to the desired temperature ranges. Upon completion of the initial phase of the polymerization, refluxing ceases. The temperature of the polymerization mixture is usually maintained for an additional period, generally at least 2 hours, in order to bring the reaction to completion and achieve the desired degree of polymerization. The reaction mixture is then stripped of unreacted monomers in conventional manner, as by vacuum distillation, and the recovered monomers directly recycled in the process. If desired, the polyhalogenous ester product may then be mixed with other reactants for further modification or storage, or it may be stored in its isolated form or employed directly as indicated elsewhere herein.

The polyester compounds of the present invention are non-self-fusible, glassy, solid or semi-sticky materials. The color of the polyesters generally ranges from Gardner Color Scale (1953 series) of 9 to 18 and higher, although the color may be further improved by using such modifications as an inert atmosphere, extremely high grades of reactants, variations in catalyst and catalyst concentration, temperature, and so forth. They are soluble in most organic polar and non-polar solvents, with the notable exception, in most cases, of diethylether and water, as well as in many monomers, including styrene, butyl methacrylate, triallylisocyanurate, diallylphthalate, et cetera. The polyesters have been found to be compatible in nearly any ratio with standard polyester resins. Because of these solubilities, it is frequently convenient to mix the polyester with further reactants and/or standard polyesters with which they are to be reacted or co-reacted, as in the case of unsaturated polyesters which are to be cross-linked, and store the resulting mixtures until needed for use. The polyester itself, being non-self-fusible, may be stored in convenient granular, powdered, or viscous but non-self-fusible form.

The molecular weights of the polyesters of the present invention range from that of the mono adduct of one dicarboxy compound molecule with one oxide molecule, generally around 275, but depending of course on the individual reactants, to more than 2,500. However, polyesters having molecular weights above 2,000 are frequently excessively viscous for convenient use in further reactions. Those in the 1,000 to 2,000 molecular weight range generally have the most workable viscosities and are, therefore, ordinarily preferred.

As stated above, the products of the present invention may be beneficially used for a variety of purposes, including use in the preparation of alkyd type resins and most applications where commercial polyesters are currently being used, but giving products with superior fire and chemical resistance. They range from liquids to rubbery elastomers to hard strong plastics. These products can be used for a variety of purposes in such diversified fields as adhesives, coatings, and the like. Otherwise the products may be used to impart beneficial characteristics to alkyd resins, in coating compositions and laminates of various types, and the like. Ethylenically unsaturated polyesters can be cross-linked with various ethylenically unsaturated cross-linking agents to yield materials useful in a wide variety of applications including flexible and rigid coatings, elastomers, rubbers, soft to hard plastics, and so forth, all having a high degree of non-flammability and chemical resistance and, in many cases, even being non-burning. The physical properties of these polyester materials may be up-graded by the addition according to well-known procedures of some auxiliary natural or synthetic material such as glass fibers, asbestos, sisal, cotton, nylon (polyamide and polyester), wood and pigment fillers, et cetera, to give reinforced plastics and laminates of superior strength and a high degree of non-flammability.

In addition, especially if ethylenically unsaturated, the polyesters may be mixed with certain drying oils such as linseed oil and perilla oil and coated on a surface to undergo oxidative non-linking or polymerization and give tough, elastic, weather and chemical resistant air-drying films which have improved fire resistance. Additional uses and modifications of the stated uses will be readily apparent to one skilled in the art.

Polymers prepared from maleic anhydride and 3,3,3-trichloropropylene oxide in a molar ratio of about 1:1 to about 1:2, especially in the presence of aluminum chloride catalyst, and polymers of maleic anhydride and 3,3-dichloropropylene oxide in a molar ratio of about 1:1 to about 1:2, especially in the presence of stannic chloride catalyst, are of particular interest and value and therefore represent preferred embodiments of the invention.

The product of the present invention is accordingly a polyester of (1) A member selected from the group consisting of organic dicarboxylic acid anhydrides and organic dicarboxylic acids and (2) A vicinal alkylene oxide selected from the group consisting of (a) a vicinal alkylene oxide containing from three to four carbon atoms, inclusive, and having an alkyl group attached to a carbon atom of the oxirane ring, said alkyl group having up to two carbon atoms and containing at least two halogen atoms, each halogen having an atomic weight of 19 to 80, inclusive, and (b) a vicinal alkylene oxide as defined in (a) together with a vicinal alkylene oxide, selected from the group consisting of saturated alkylene oxides and alkylene oxides which are free from other than aromatic unsaturation, having as a substituent attached to a carbon atom of the oxirane ring a member of the group consisting of hydrogen and an alkyl group, said alkyl group having up to two carbon atoms inclusive and containing from zero to one halogen atom, inclusive, any halogen having an atomic weight of 19 to 80, inclusive, said alkylene oxide as defined in (a) being present in amount of at least about 50% by weight of the total amount of alkylene oxide as defined in (b), said polyester being characterized by the presence of pendant haloalkyl groups which have up to two carbon atoms and which contain at least two halogen atoms.

The process of the invention is accordingly a process for preparing a polyester which is characterized by the presence of pendant haloalkyl groups which have up to two carbon atoms and which contain at least two halogen atoms, comprising reacting (1) A member selected from the group consisting of (a) organic dibasic acid anhydrides, (b) organic dibasic acids, and (c) mixtures of (a) with (b), and (2) A vicinal alkylene oxide, selected from the group consisting of (a) a vicinal alkylene oxide containing from three to four carbon atoms, inclusive, and having an alkyl group attached to a carbon atom of the oxirane ring, said alkyl group having up to two carbon atoms and containing at least two halogen atoms, each halogen having an atomic weight of 19 to 80, inclusive, and (b) an alkylene oxide as defined in (a) together with a vicinal alkylene oxide, selected from the group consisting of saturated alkylene oxides and alkylene oxides which are free from other than aromatic unsaturation, having as a substituent attached to a carbon atom of the oxirane ring a member of the group consisting of hydrogen and an alkyl group, said alkyl group having up to two carbon atoms and containing from zero to one halogen atom, inclusive, any halogen having an atomic weight of 19 to 80, inclusive, said alkylene oxide as defined in (a) being present in amount of at least about 50% by weight of the total amount of alkylene oxide as defined in (b), preferably in the presence of a reaction catalyst.

The following examples are given by way of illustration only and are not to be construed as limiting. The molar ratio of reactants is given in the heading for each example. The position of the numbers corresponds to the position of the reactants mentioned in the example heading.

*Example 1.—Polyester from maleic anhydride and 3,3,3-trichloropropylene oxide (1:2 molar ratio)*

The equipment consisted of a three-liter jacketed resin kettle heated by circulating hot ethylene glycol and equipped with an upright condenser, stirrer, and thermometer. Connected to the resin kettle was a one-liter round-bottom flask equipped with a heating mantle, stirrer, condenser and thermometer and through which the catalyst-monomer complex could be incrementally added to the resin kettle.

The resin kettle was cleaned, dried, purged with nitrogen and heated to 160° C. To 196.2 grams (2 moles) of maleic anhydride melted in the one-liter round-bottom flask were added 2 grams (0.015 mole) of freshly sublimed aluminum chloride, resulting in a slightly exothermic reaction. After the addition of 432.7 milliliters (4 moles) of 3,3,3-trichloropropylene oxide to the catalyst-monomer complex, the reaction mixture was heated to 80 to 90° C. and maintained at this temperature to prevent crystallization of the anhydride.

When the resin kettle had been heated to about 160° C., approximately 200 ml. of the reaction mixture was transferred from the round-bottom flask to the resin kettle by the use of nitrogen pressure. At about 150° C. the chloropropylene oxide began to reflux. The remainder of the reaction mixture was added incrementally to the resin kettle at a rate sufficient to maintain a gentle reflux. At the end of one hour all the reactants had been added to the resin kettle, whereafter the reaction mixture was maintained at 150° C. for one additional hour and then vacuum stripped of unreacted monomers. The product was a light tan polymer. The product was a brittle solid at room temperature which was light tan in color and which had a melting point of about 65° C.

*Example 2.—Polyester from maleic anhydride and 3,3,3-trichloropropylene oxide (1:1 molar ratio)*

In a one-liter round-bottom flask equipped with a thermometer, stirrer, and condenser, 196 grams (2 moles) of maleic anhydride were melted and reacted with 1.3 grams (0.01 mole, 0.25 mole percent) of freshly sublimed aluminum chloride to form a catalyst-monomer complex. To this slurry was added 323 grams (2 moles) of 3,3,3-trichloropropylene oxide, whereafter the reaction mixture was heated to 150° C., at which temperature the 3,3,3-trichloropropylene oxide began to reflux and polymerization initiated. An exothermic heat of reaction with a temperature rise of approximately 50° C. was observed. The over-all polymerization required about 20 minutes. The reaction mixture was subjected to vacuum stripping at 150° C. at 0.5 mm. of mercury and no unreacted monomer was removed. The product was a dark, viscous oil.

*Example 3.—Polyester from maleic anhydride and 3,3,3-trichloropropylene oxide (1:3 molar ratio)*

A catalyst-anhydride monomer complex was prepared by reacting at about 90° C. 196.2 grams (2 moles) of maleic anhydride with 4 grams (0.03 mole) of freshly sublimed anhydrous aluminum chloride. To this slurry was added 484 grams (3 moles) of 3,3,3-trichloropropylene oxide and the mixture was heated to about 160° C., at which temperature polymerization was initiated. After approximately 15 minutes an additional 484 grams (3 moles) of 3,3,3-tricholoropropylene oxide was added and the reaction mixture was heated to 160° C. for a total polymerization time of 19 hours. The reaction mixture was then vacuum stripped to remove any unreacted monomers, cooled to approximately 100° C., and poured into bottles. The yield of isolated polychloroester was 1004 grams, which corresponds to an 87% conversion. The molecular weight as determined by boiling point elevation was 1300. The product was a dark tan brittle solid at room temperature which became a highly viscous liquid at 100° C.

*Example 4.—Polyester from maleic anhydride and 3,3-dichloropropylene oxide (1:2 molar ratio)*

To a mixture of 508 grams (4 moles) of 3,3-dichloropropylene oxide and 196 grams (2 moles) of maleic anhydride was added 4.8 milliliters (0.04 mole) of anhydrous tin tetrachloride. The reaction mixture was initially cooled to prevent overheating and then maintained at a temperature of 100 to 120° C. for 5 hours. At the end of this time the conversion was essentially quantitative, so the reaction mixture was vacuum stripped of unreacted monomers. The resulting product had a molecular weight of about 1400 and a chlorine content of 42%. The product was a dark brown brittle solid at room temperature which had a melting point of about 55° C.

*Example 5.—Polyester from maleic anhydride and 3,3-dichloropropylene oxide (1:2 molar ratio)*

Example 4 was repeated using toluene as a solvent. After heating at 112° C. for 20 hours, a 90% conversion to the desired polyester was achieved. The yield in the reaction was 96%. The final polychloroester contained 42% chlorine and had a molecular weight of about 1,000. The product was a dark tan brittle solid at room temperature.

*Example 6.—Polyester from maleic anhydride and 3,3-dichloropropylene oxide (1:2 molar ratio)*

Maleic anhydride (24.5 grams, 0.25 mole) was dissolved in 63.5 grams (0.5 mole) of 3,3-dichloropropylene oxide by warming the mixture slightly. The solution was then cooled to room temperature and 0.7 gram (0.005 mole) of aluminum chloride catalyst was added, causing a slight evolution of heat. The reaction mixture was heated in a water bath for approximately 7 hours, followed by an additional heating at 100° C. for 9 hours. At this time the unreacted 3,3-dichloropropylene oxide was distilled off under vacuum to yield 77 grams of a polymeric product (87.5% yield) having a molecular weight of approximately 780. The product was a brittle solid at room temperature, reddish brown in color, which became a viscous oil at 100° C.

*Example 7.—Polyester from maleic anhydride and 3,3-dichloropropylene oxide (1:1 molar ratio)*

In a one-liter round-bottom flask equipped with thermometer, condenser, and mechanical stirrer, 127 grams (1 mole) of 3,3-dichloropropylene oxide, 98 grams (1 mole) of maleic anhydride, and 1 milligram of anhydrous ferric chloride were mixed in 400 ml. of toluene solvent, and the mixture heated until the solvent refluxed. After 2 hours, reaction had ceased and the toluene was stripped off under vacuum after being filtered through a Celite diatomaceous earth filter bed. The polymeric material was obtained in 95% yield and had a molecular weight of 1700 as determined by boiling point elevation technique. The polyester was a very dark brown, brittle solid which dissolved readily into styrene at about 60° C.

*Example 8.—Polyester from maleic anhydride and 3,3-dichloropropylene oxide (1:3 molar ratio)*

Equipment similar to that of Example 7 was used in carrying out this example. A mixture of 127 grams (1 mole) of 3,3-dichloropropylene oxide, 33 grams (0.33 mole) of maleic anhydride, and 1.2 ml. (0.01 mole) of stannic chloride in 500 ml. of toluene was refluxed for approximately 15 hours. At the end of this time, the toluene was removed under vacuum, leaving 144 grams of product corresponding to a 90% yield. The product was a dark tan, transparent solid at room temperature.

*Example 9.—Polyesters from maleic anhydride and 3,3-dichloropropylene oxide (1:5 molar ratio)*

In the manner of Example 8, maleic anhydride was reacted with 3,3-dichloropropylene oxide in a molar ratio of 1 to 5 using various catalysts. In each case 0.0015 equivalent catalyst concentration was used. The results of these polymerizations are given in the table.

TABLE

| Catalyst | Percent yield of Polymeric product |
|---|---|
| Aluminum bromide | 37 |
| Stannic chloride | 51 |
| Titanium tetrachloride | 16 |
| Boron trifluoride etherate | 50 |

*Example 10.—Polyester from maleic anhydride, 3,3,3-trichloropropylene oxide, and 3,3-dichloropropylene oxide (1:1:1 molar ratio)*

This example illustrates the use of more than one polyhalogenous alkylene oxide to prepare a polyester.

In a three-necked flask equipped with a stirrer, thermometer, foam trap, and dropping funnel, 3 grams (0.0225 mole) of sublimed aluminum chloride was reacted with 196.2 grams (2 moles) of maleic anhydride at 70 to 80° C. To this complex were added 322.8 grams (2 moles) of 3,3,3-trichloropropylene oxide and 254.0 grams (2 moles) of 3,3-dichloropropylene oxide. The mixture was heated to 150 to 155° C. for 1 hour after which unreacted monomer was removed by vacuum stripping. A gas chromatogram of the unreacted polyhalogenous propylene oxide stripped from the reaction mixture showed two pronounced peaks, one for the 3,3-dichloropropylene oxide and the other for the 3,3,3-trichloropropylene oxide, and indicated quantitatively that both reacted with the maleic anhydride to form a terpolymer. The product was light tan in color and was a viscous liquid at 110° C.

*Example 11.—Polyester from maleic anhydride, 3,3,3-trichloropropylene oxide, and propylene oxide (1:2:1 molar ratio)*

This example illustrates the use of a non-halogenous alkylene oxide in addition to a polyhalogenous alkylene oxide in the preparation of polyesters.

In a one-liter round-bottom flask equipped with a stirrer, condenser, addition funnel, and temperature recorder, 98.1 grams (1 mole) of maleic anhydride and 322.8 grams (2 moles) of 3,3,3-trichloropropylene oxide were mixed and heated to 135° C., at which temperature 1 gram of sublimed aluminum chloride dissolved in 10 ml. of anhydrous diethylether was introduced. The polymerization mixture was maintained at a temperature of 150 to 170° C. for approximately 40 minutes, after which time approximately 35 ml. (0.5 mole) of propylene oxide was added dropwise over the course of 70 minutes. The unreacted monomer was removed by vacuum stripping for 5 minutes at 1 mm. of mercury pressure. Vapor phase chromatogram of the stripped liquid indicated the presence of a small amount of propylene oxide as well as some 3,3,3-trichloropropylene oxide and some diethylether from the catalyst, and showed that a terpolymer was formed. The product was a brittle solid, dark tan in color.

*Example 12.—Polyester from maleic anhydride and 1,1,1-trichloro-3,4-epoxybutane (1:2 molar ratio)*

In a 500 ml. round-bottom flask equipped with a mechanical stirrer, condenser, and thermometer, 1 gram (.007 mole) freshly sublimed anhydrous aluminum chloride was reacted with 98.1 grams (1 mole) of maleic anhydride at 90° C. to form a catalyst complex. To this slurry was added 350.8 grams (2 moles) of 1,1,1,-trichloro-3,4-epoxybutane and the mixture was then heated at 160 to 180° C. for 3.75 hours. At the end of this time, the unreacted monomer was removed by vacuum stripping and the polymer product cooled to approximately 100° C. and poured into bottles. The yield was 401 grams of polyester product, corresponding to an 89% conversion, having a molecular weight of 1037 as determined by boiling point elevation. The product was a brittle solid at room temperature, dark brown in color.

*Example 13.—Polyester from maleic anhydride and 3-bromo-3,3-dichloropropylene oxide (1:2 molar ratio)*

In a 250 ml. round-bottom flask equipped with a mechanical stirrer, thermometer, and water-cooled condenser, 0.2 gram (0.015 mole) of freshly sublimed anhydrous aluminum chloride was added to 19.6 grams (0.2 mole) of maleic anhydride at a temperature of about 70° C. After 5 minutes, 82.4 grams (0.4 mole) of 3-bromo-3,3-dichloropropylene oxide was added and the mixture heated to about 160° C., at which temperature the reaction went through a 30° C. temperature rise due to the exothermic heat of reaction. The reaction mixture was thereafter heated at 150 to 156° C. for approximately 5 hours, at the end of which time 13 grams of unreacted monomer was removed by vacuum stripping at 1 mm. of mercury pressure. The polymeric residue corresponded to an 88% yield. The product was a brittle solid at room temperature and had a dark brown color.

*Example 14.—Polyester from fumaric acid and 3,3,3-trichloropropylene oxide (1:2 molar ratio)*

In a 300 ml. round-bottom flask equipped with a mechanical stirrer, thermometer, and water-cooled condenser, 23.2 grams (0.2 mole) of fumaric acid, 64.4 grams (0.4 mole) of 3,3,3-trichloropropylene oxide, and about 0.2 gram of freshly sublimed anhydrous aluminum chloride were mixed and slowly heated. The trichloropropylene oxide began to reflux at approximately 154° C., at which temperature the fumaric acid began slowly to dissolve. The temperature was maintained at 160 to 190° C. for 240 minutes, during which time the fumaric acid went completely into solution. Water of reaction was also observed. The reaction mixture was vacuum stripped for 5 minutes at 1 mm. of mercury pressure. The final polyester product weighed 87 grams, corresponding to a 100% yield. The product was a very dark brown resinous material at room temperature.

*Example 15.—Polyester from itaconic acid and 3,3-dichloropropylene oxide (1:2 molar ratio)*

In a one-liter round-bottom flask equipped with a mechanical stirrer, thermometer, and water-cooled condenser, 130 grams (1 mole) of itaconic acid, 254 grams (2 moles) of 3,3-dichloropropylene oxide, and 0.5 gram of tin oxalate with a trace of hydroquinone were mixed and the mixture heated to 150° C. for 20 hours. Volatile materials were then stripped from the reaction product at 200° C. under 1 mm. of mercury pressure. The residue was a viscous material weighing 349 grams, corresponding to a 91% yield, and containing 36.5% chlorine. It was confirmed by infrared analysis to be the desired polychloroester. The product was a light brown, hard, transparent solid at room temperature.

*Example 16.—Polyester from phthalic anhydride, maleic anhydride and 3,3-dichloro-propylene oxide (1:2:6 molar ratio)*

A mixture of phthalic anhydride, maleic anhydride, and 3,3-dichloropropylene oxide in a molecular ratio of 1:2:6 was reacted for 16 hours at 140° C. in the presence of stannic chloride catalyst. At the end of this time, a 58% conversion was realized, the phthalic anhydride not having reacted completely, even though infrared analysis revealed the presence of both benzene and double bond absorptions in the product. By continuing the reaction for an additional 47 hours, a 100% conversion was achieved. The product was a reddish-brown, transparent, polymeric solid.

*Example 17.—Polyester from fumaric acid, maleic anhydride, and 3,3,3-trichloropropylene oxide (1:1:4 molar ratio)*

In a 300 ml. round-bottom flask equipped with a mechanical stirrer, thermometer, and water-cooled condenser, 9.8 grams (0.1 mole) of maleic anhydride was heated to about 85° C. and about 0.2 gram of freshly sublimed aluminum chloride added to form a catalyst complex. To this slurry 11.6 grams (0.1 mole) of fumaric acid and 64.4 grams (0.4 mole) of 3,3,3-trichloropropylene oxide were added and the mixture slowly heated. The mixture was heated between 182 and 188° C. for 30 minutes during which time complete solution was achieved, and then maintained in this same temperature range for an additional 6 hours. At the end of this time, unreacted monomer and water of reaction were stripped at 1 mm. of mercury pressure for 5 minutes. The final polyester was obtained in a yield of 84 grams.

Various modifications and equivalents will be apparent to one skilled in the art and may be made in the method, products, or process of the present invention without departing from the spirit or scope thereof, and it is to be understood that the invention is to be limited only by the scope of the appended claims.

I claim:

1. A polyester formed by copolymerizing in admixture reactants consisting essentially of
   (1) a member selected from the group consisting of organic dicarboxylic acid anhydrides and organic dicarboxylic acids, and
   (2) a vicinal alkylene oxide selected from the group consisting of
      (a) an alkylene oxide containing from three to four carbon atoms, inclusive, and having an alkyl group attached to a carbon atom of the oxirane ring, said alkyl group having up to two carbon atoms and containing at least two halogen atoms, each halogen having an atomic weight of 19 to 80, inclusive, and
      (b) a vicinal alkylene oxide as defined in (a) together with a vicinal alkylene oxide, selected from the group consisting of saturated alkylene oxides and alkylene oxides which are free from other than aromatic unsaturation, having as a substituent attached to a carbon atom of the oxirane ring a member of the group consisting of hydrogen and an alkyl group, said alkyl group having up to two carbon atoms, inclusive, and containing from zero to one halogen atom, inclusive, any halogen having an atomic weight of 19 to 80, inclusive, said alkylene oxide as defined in (a) being present in amount of at least about 50% by weight of the total amount of alkylene oxide as defined in (b), the molar ratio of (1) to (2) being about 1:1 to about 1:6, said polyester being characterized by the presence of pendant haloalkyl groups which have up to 2 carbon atoms and which contain at least 2 halogen atoms.

2. A polyester of (1) a member formed by copolymerizing in admixture reactants consisting essentially of the group consisting of organic dicarboxylic acid anhydrides and organic dicarboxylic acids, and (2) a 3,3-dihalopropylene oxide, the molar ratio of (1) to (2) being about 1:1 to about 1:6.

3. A polyester formed by copolymerizing in admixture reactants consisting essentially of maleic anhydride and 3,3-dichloropropylene oxide, the molar ratio of (1) to (2) being about 1:1 to about 1:6.

4. A polyester formed by copolymerizing in admixture reactants consisting essentially of (1) a member of the group consisting of organic dicarboxylic acid anhydrides and organic dicarboxylic acids, and (2) a 3,3,3-trihalopropylene oxide, the molar ratio of (1) to (2) being about 1:1 to about 1:6.

5. A polyester formed by copolymerizing in admixture reactants consisting essentially of maleic anhydride and 3,3,3-trichloropropylene oxide, the molar ratio of (1) to (2) being about 1:1 to about 1:6.

6. A polyester formed by copolymerizing in admixture reactants consisting essentially of maleic anhydride, 3,3,3-trichloropropylene oxide, and 3,3-dichloropropylene oxide, wherein the number of moles of maleic anhydride and the sum of the number of moles of 3,3,3-trichloropropylene oxide and 3,3-dichloropropylene oxide are in a ratio of about 1:1 to about 1:6.

7. A polyester formed by copolymerizing in admixture reactants consisting essentially of (1) maleic anhydride, (2) 3,3,3-trichloropropylene oxide, and (3) propylene oxide, the 3,3,3-trichloropropylene oxide being present in amount of at least about 50% by weight of (2) and (3), wherein the number of moles of maleic anhydride and the sum of the number of moles of 3,3,3-trichloropropylene oxide and propylene oxide are in a ratio of about 1:1 to about 1:6.

8. A polyester formed by copolymerizing in admixture reactants consisting essentially of maleic anhydride and 1,1,1-trichloro-3,4-epoxybutane, wherein said maleic anhydride and 1,1,1-trichloro-3,4-epoxybutane are in a molar ratio of about 1:1 to about 1:6.

9. A polyester formed by copolymerizing in admixture reactants consisting essentially of maleic anhydride and 3-bromo-3,3-dichloropropylene oxide, wherein said maleic anhydride and 3-bromo-3,3-dichloropropylene oxide are in a molar ratio of about 1:1 to about 1:6.

10. A polyester formed by copolymerizing in admixture reactants consisting essentially of fumaric acid and 3,3,3-trichloropropylene oxide, wherein said fumaric acid and 3,3,3-trichloropropylene oxide are in a molar ratio of about 1:1 to about 1:6.

11. A polyester formed by copolymerizing in admixture reactants consisting essentially of itaconic acid and 3,3-dichloropropylene oxide, wherein said itaconic acid and 3,3-dichloropropylene oxide are in a molar ratio of about 1:1 to about 1:6.

12. A polyester formed by copolymerizing in admixture reactants consisting essentially of (1) maleic anhydride, (2) phthalic anhydride, and (3) 3,3-dichloropropylene oxide, wherein the sum of the number of moles of phthalic anhydride and maleic anhydride and the number of moles of 3,3-dichloropropylene oxide are in a ratio of about 1:1 to about 1:6 and wherein the maleic anhydride is present in amount at least about 40% of the total weight of maleic anhydride and phthalic anhydride.

13. A polyester formed by copolymerizing in admixture reactants consisting essentially of fumaric acid, maleic anhydride, and 3,3,3-trichloropropylene oxide, wherein the sum of the number of moles of fumaric acid and maleic anhydride and the number of moles of 3,3,3-trichloropropylene oxide are in a ratio of about 1:1 to about 1:6.

14. A polyester formed by copolymerizing in admixture reactants consisting essentially of maleic anhydride and 3,3,3-trichloropropylene oxide in a molar ratio of about 1:1 to about 1:2.

15. A polyester formed by copolymerizing in admixture reactants consisting essentially of maleic anhydride and 3,3-dichloropropylene oxide in a molar ratio of about 1:1 to about 1:2.

16. A polyester formed by copolymerizing in admixture reactants consisting essentially of maleic anhydride and 3,3,3-trichloropropylene oxide in a molar ratio between about 1:1 and about 1:2 in the presence of aluminum chloride catalyst.

17. A polyester formed by copolymerizing in admixture reactants consisting essentially of maleic anhydride and 3,3-dichloropropylene oxide in a molar ratio between about 1:1 and about 1:2 in the presence of stannic chloride catalyst.

18. A polyester according to claim 1 containing the following recurring structural units:

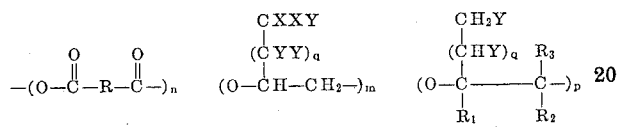

the respective subunits thereof being designated: "A," "B," and "C," in that order, wherein R is the residue of an organic dibasic acid anhydride having up to and including 12 carbon atoms, Y is selected from the group consisting of hydrogen and halogen having an atomic weight of 19 to 80, inclusive, no more than one Y in subunit "C" being halogen, X is halogen having an atomic weight of 19 to 80, inclusive, $q$ is selected from 0 and 1, $n$ and $m$ are integers from 1 to 3, inclusive, $p$ is selected from 0 and an integer from 1 to 3, inclusive, $R_1$, $R_2$, and $R_3$ are the same or different and are selected from the group consisting of hydrogen and saturated and aromatically unsaturated organic radicals, the maximum number of carbon atoms in $R_1$, $R_2$ and $R_3$ combined being 16, the weight of all subunits "C" when present not exceeding about 50% of the combined weight of all subunits "B" and "C" taken together, and the subunits "A," "B," and "C" being present in the recurring structural units in any order.

19. A polyester according to claim 18, having a molecular weight of about 1,000 to about 2,000.

References Cited by the Examiner

UNITED STATES PATENTS

| | | | |
|---|---|---|---|
| 2,921,929 | 1/1960 | Phillips et al. | 260—78.4 |
| 3,060,146 | 10/1962 | Wismer et al. | 260—75 |
| 3,135,705 | 6/1964 | Vandenberg | 260—2 |
| 3,151,129 | 9/1964 | Leumann et al. | 260—78.4 |

FOREIGN PATENTS

| | | |
|---|---|---|
| 609,715 | 11/1960 | Canada. |
| 1,143,132 | 11/1955 | France. |
| 500,300 | 2/1939 | Great Britain. |
| 884,033 | 12/1961 | Great Britain. |

OTHER REFERENCES

Industrial and Eng. Chem., Smith et al., vol. 49, No. 8, August 1957 (pages 1241–1246).

Paquin: "Epoxyverbundungen und Epoxydharze" 1958, TP 986E6 p. 241 relied on.

JOSEPH L. SCHOFER, *Primary Examiner.*

DONALD E. CZAJA, *Examiner.*

LESLIE WOLF, *Assistant Examiner.*